United States Patent [19]

Sapir

[11] 3,815,815

[45] June 11, 1974

[54] SOLID STATE THERMOSTAT

[75] Inventor: Said Sapir, Westlake Village, Calif.

[73] Assignee: International Telephone and Telegraph Corporation, New York, N.Y.

[22] Filed: Sept. 5, 1972

[21] Appl. No.: 286,740

[52] U.S. Cl. .................................... 236/78, 165/26

[51] Int. Cl. ............................................ G05d 23/30

[58] Field of Search ......................... 236/78; 165/26; 317/148.5 B

[56] References Cited

UNITED STATES PATENTS 3,516,484 6/1970 Chambers ............................ 165/26

*Primary Examiner*—William E. Wayner

*Attorney, Agent, or Firm*—A. Donald Stolzy

[57] ABSTRACT

Electrical thermostats which require the running of only a minimum number of lead wires for a maximum number of functions. In one case, a capacitor smooths the firing potential of a unijunction to prevent rapid cycling, undue noise and wear. In another case, a differential amplifier with capacitor smoothed positive feedback prevents unwanted fast cycling. In both cases, the unijunction and the differential amplifier receive inputs from a thermistor bridge and control the passage of current through a full-wave diode bridge via a silicon-controlled rectifier.

9 Claims, 3 Drawing Figures

SOLID STATE THERMOSTAT

BACKGROUND OF THE INVENTION

This invention relates to heating and/or cooling systems, and more particularly, to solid state thermostats therefor.

In the past, prior art solid state thermostats have not been popular because they have required one or more additional power leads not required by primarily mechanical thermostats.

Prior art solid state thermostats have also tended to cycle much too rapidly.

SUMMARY OF THE INVENTION

In accordance with the present invention, the above-described and other disadvantages of the prior art are overcome by providing a solid state thermostat requiring no additional leads to supply electrical power thereto.

A further feature of the invention resides in the use of a capacitor to limit the cycles per unit time through which the thermostat can go.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENTS

Figure 1:
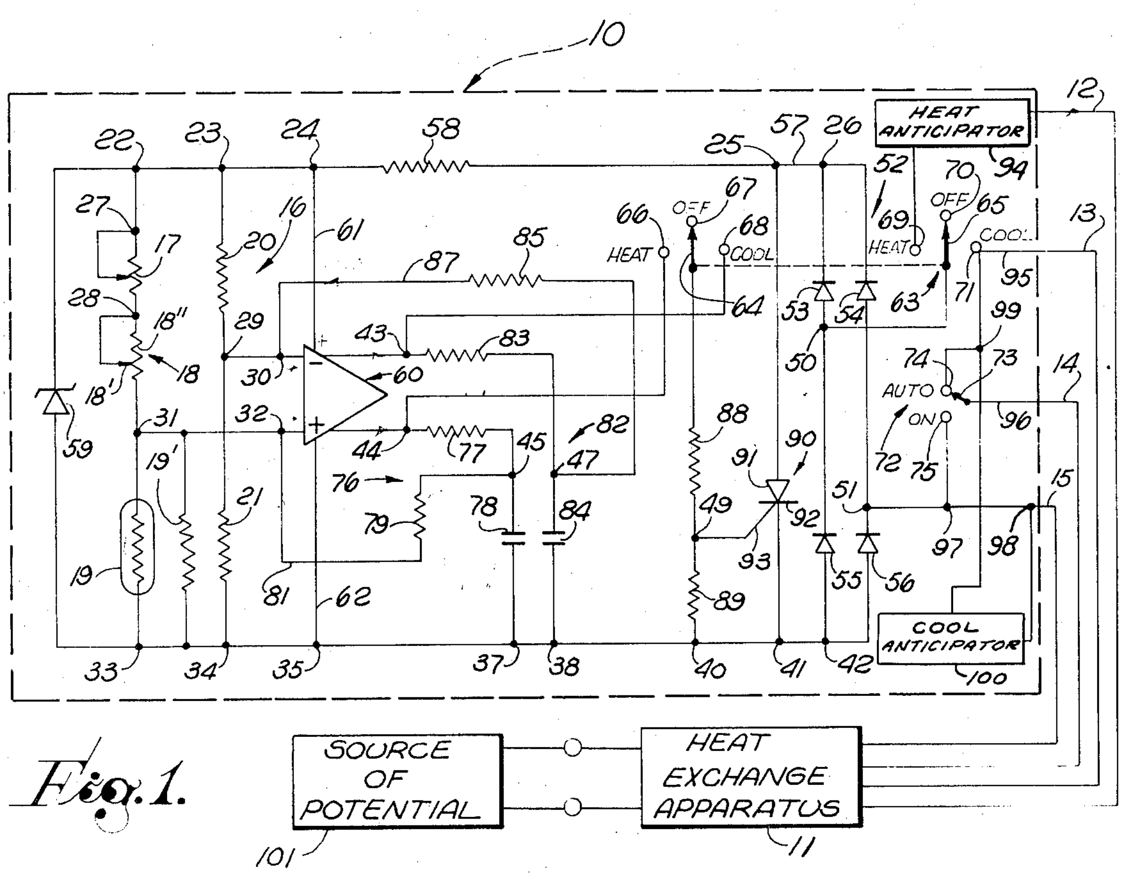
FIG. 1 is a schematic diagram of one embodiment of the present invention.

In FIG. 1, a thermostat 10 is connected to heat exchanger apparatus 11 by four leads 12, 13, 14 and 15.

Thermostat 10 includes a bridge 16 including a calibrating potentiometer 17, a set point potentiometer 18, a thermistor 19, a resistor 20, a resistor 21 and a shunt resistor 19'. Various junctions are shown throughout the thermostat 10 at 22, 23, 24, 25, 26, 27, 28, 29, 30, 31, 32, 33, 34, 35, 37, 38, 40, 41 and 42.

Junctions are also provided at 43, 44, 45, 47, 49, 50 and 51.

Toward the right end of the thermostat 10, a diode bridge 52 is provided including diodes 53, 54, 55 and 56. Diode bridge 52 is formed with corners at junctions 50, 26, 51, and 42. Diode 53 is connected between junctions 50 and 26, and pooled to be conductive in a direction toward junction 26. Diode 54 is connected between junctions 51 and 26, and poled to be conductive in a direction toward junction 26. Diode 55 is connected between junctions 42 and 50, and poled to be conductive in a direction toward junction 50. Diode 56 is connected between junctions 42 and 51, and poled to be conductive in a direction toward junction 51. A lead 57 is connected between junctions 25 and 26. A current limiting resistor 58 is connected between junctions 24 and 25. Junctions 22, 23 and 24 are all connected together.

Junctions 33–35, inclusive, 37, 38 and 40–42, inclusive, are all connected together.

A zener diode 59 is connected between junctions 33 and 22, and poled to be back biased by a potential at junction 22 more positive than a potential at junction 33.

A differential amplifier is provided at 60 having a positive power input lead 61 connected from junction 24, and a negative power input lead 62 connected from junction 35.

Junctions 29 and 30 are connected to the inverting input of amplifier 60. Junctions 31 and 32 are connected to the non-inverting input of amplifier 60. A double-pole, triple-throw switch 63 is provided having poles 64 and 65 ganged together. Pole 64 has heat, off and cool contacts 66, 67 and 68, respectively. Pole 65 has corresponding heat, off and cool contacts 69, 70 and 71. A fan switch 72 has a pole 73, and automatic and on contacts 74 and 75, respectively.

The inverted and non-inverted outputs of amplifier 60 are respectively connected to junctions 43 and 44. Junctions 43 and 44 are then connected to the contacts 68 and 66, respectively. A positive feedback circuit 76 includes a resistor 77, a capacitor 78 and a resistor 79. Resistor 77 is connected between junctions 44 and 45. Capacitor 78 is connected between junctions 45 and 37. Resistor 79 is connected between junctions 45 and 32. Amplifier 60 is provided with a positive feedback to the non-inverting input thereof over a lead 81.

Positive feedback is also provided by a circuit 82 including a resistor 83, a capacitor 84 and a resistor 85. Resistor 83 is connected between junctions 43 and 47. Capacitor 84 is connected between junctions 47 and 38. Resistor 35 is connected between junctions 47 and 30.

Positive feedback is provided to the inverting input of amplifier 60 over a lead 87.

A resistor 88 is connected between pole 62 and junction 49. A resistor 89 is connected between junctions 49 and 40. A silicon-controlled rectifier (SCR) 90 includes an anode 91, a cathode 92 and a gate 93 connected respectively to junction 25, junction 41 and junction 49.

A resistor 94 is connected from heat contact 69 to apparatus 11. A lead 95 also connects cool contact 71 to apparatus 11. A lead 96 connects pole 73 to apparatus 11. Junction 51 is also connected to junctions 97 and 98, and to apparatus 11.

Pole 65 is connected to junction 50.

Thermostat 10 includes a junction 99 which is connected to cool contact 71. Junction 99 is also connected to automatic contact 74. A resistor 100 is connected between junctions 98 and 99. On contact 75 is connected to junction 97.

An A.C. source of potential 101 provides A.C. power to energize one or more components of apparatus 11, and, simultaneously, to supply power to thermostat 10.

Thermostat 10 is selectively operable. This selection is performed manually. Depending upon which selection is made, thermostat 10 will control apparatus 11 to maintain a substantially constant temperature in a room.

If it is cold outside, switch 63 is turned to the heat position. In this case, until the temperature sensed by thermistor 19 is equal to the temperature set by potentiometer 18, SCR 90 will be gated on each half cycle of the output voltage of source 101. During this time, the circuit to, for example, a gas valve may be closed through line 12, line 15 being the common line. Electric heating, however, is also possible. Resistor 94 performs the function of a heater conventionally called a heat anticipator. It is connected in series with, for example, the gas valve. It serves to heat thermistor 19 to prevent the system from over heating. It may be placed in a position close to thermistor 19, if desired. Anticipator 94 thus prevents overshoot. The positions of switch 72 make it possible to run the fan all the time, or automatically. When pole 73 engages on contact 75, the fan runs all the time. When pole 73 engages contact 74, the fan runs all the time during operation of cooling apparatus or a compressor, but only runs when the plenum is at a predetermined temperature or above during heating, a conventional plenum thermostatic switch being provided for that purpose.

Resistor 100 is a conventional cool anticipator.

OPERATION OF THE EMBODIMENT OF FIG. 1

In the operation of the embodiment of FIG. 1, the thermistor bridge 16 detects a difference between the temperature set in accordance with the position of wiper 18′ on potentiometer winding 18″ and the temperature sensed by thermistor 19. This difference is amplified by amplifier 60. Depending upon which of the heat and cool contacts 66 and 68 are engaged by pole 64, heating or cooling will be provided by supplying a gating voltage to gate 93 of SCR 90 from pole 64 through resistors 88 and 89, which resistors form a voltage divider. At the same time, one of the circuits 76 and 82 prevent the output of amplifier 60 from switching back and forth between heat and off or cool and off, as the case may be.

Figure 2:
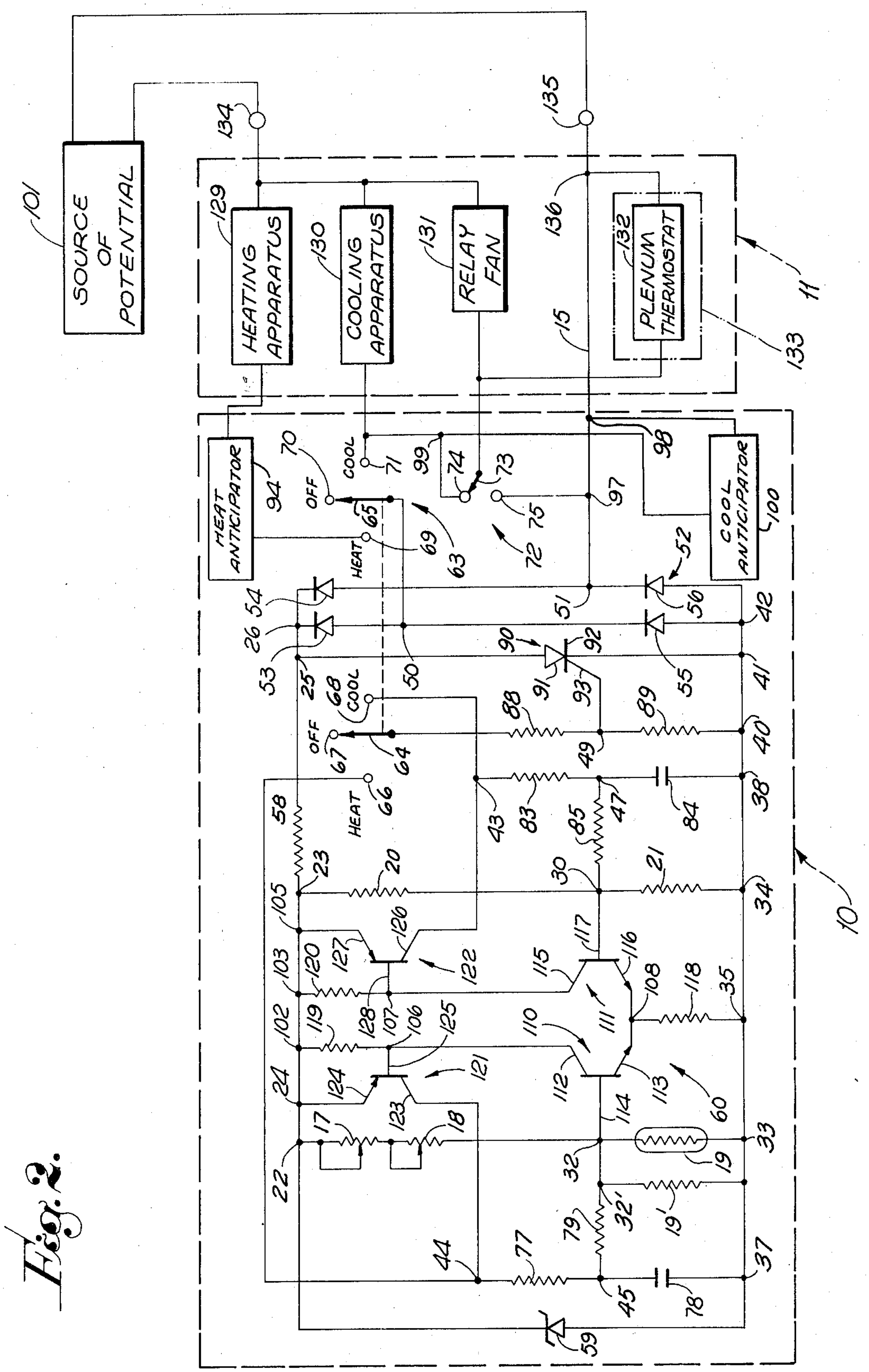
FIG. 2 is a schematic diagram of the invention shown in FIG. 1; but shown in greater detail.

The circuit of FIG. 2 is identical to the circuit of FIG. 1, except that certain parts of apparatus 11 have been shown in greater detail with certain parts of amplifier 60. Only these parts will be described in further detail.

As shown in FIG. 2, amplifier 60 has junctions 24, 102, 103, 105, 106, 107, 108 and 35. Amplifier 60 also includes NPN-type transistors 110 and 111. Transistor 110 has a collector 112, an emitter 113 and a base 114. Transistor 111 has a collector 115, an emitter 116 and a base 117, Emitters 113 and 116 are connected to junction 108. An emitter resistor 118 is connected between junctions 108 and 35. Bases 114 and 117 are connected respectively to junctions 32 and 30. Collectors 112 and 115 are connected respectively to junctions 106 and 107. Resistors 119 and 120 are connected respectively between junctions 106 and 102, and 107 and 103. Amplifier 60 also includes PNP-type transistors 121 and 122. Transistor 121 includes a collector 123, an emitter 124 and a base 125. Transistor 122 includes a collector 126, an emitter 127 and a base 128. Bases 125 and 128 are connected respectively to junctions 106 and 107. Emitters 124 and 127 are connected respectively to junctions 24 and 105. Collectors 123 and 126 are connected respectively to junctions 44 and 43.

Heating apparatus 129, shown in FIG. 2, may be, as stated previously, a gas valve, if desired. Cooling apparatus indicated at 130 in FIG. 2 may be a compressor.

A fan relay 131 and a plenum thermostat 132, respectively, are also shown in apparatus 11, a plenum being indicated at 133 therein. Source 101 may have ouput terminals 134 and 135. The right sides of each of the heating apparatus 129, the cooling apparatus 130 and the fan relay 131 are connected to terminal 134. The right side of plenum thermostat 132 is connected to terminal 135.

Heat anticipator 94 is then connected from the left side of heating apparatus 129 to contact 69 of switch 63, as stated previously. The left-hand side of cooling apparatus 130 is connected to contact 71, and to junction 99. Source 101 has its output terminal 135 also connected to junction 51 and to junctions 97 and 98, as before. Pole 73 of switch 72 is connected to the left side of fan relay 131, and to the left side of plenum thermostat 132.

In FIGS. 1 and 2, fast cycling is avoided by using the capacitors 78 and 84 which integrate the non-inverted and inverted inputs of amplifier 60, respectively. These integrated outputs are then applied as positive feedback in either case.

The thermostat of the present invention has several advantages over mechanical thermostats. For example, the thermostat of the present invention is more accurate than mechanical thermostats. Although the solid state thermostat of the present invention requires a small amount of electrical input power, it requires no more lead wires than a mechanical thermostat.

In FIG. 2, apparatus 11 has four leads extending from thermostat 10. All mechanical thermostats for performing all the functions of thermostats 10 would also have four leads connected to apparatus 11. Thus, the thermostat 10 of the present invention has the said advantages over mechanical thermostats and, yet, requires no additional power leads.

As shown in FIGS. 1 and 2, line 15 connects junctions 51, 97, 98 and 136 with terminal 135. Line 15 may then be considered to be a common line. Note will be taken that it is an advantage of the present invention that no power lead for thermostat 10 is required other than common line 15. Power is supplied between diode bridge junctions 26 and 42 because one of the diodes 55 and 56 connect one of the junctions 50 or 51 with junction 42, depending upon the polarity of the output voltage between terminals 134 and 135. Similarly, junction 50 or junction 51 is connected to junction 26 either by diode 53 or by diode 54.

In effect, heating apparatus 129 is placed in series with the thermostat 10. The thermostat 10 then controls the actuation of the heating apparatus 29. At the same time, thermostat 10 receives power through heating apparatus 129 whether or not it is actuated. The same is true of cooling apparatus 130. When pole 73 engages contact 74, both cooling apparatus 130 and fan relay 131 are connected in parallel. This parallel combination then is connected in series with terminal 134 and thermostat 10.

In accordance with the foregoing, it is unnecessary to provide an additional power lead to thermostat 10. Common lead 15 would be required, in any case, to operate heating apparatus 129 and cooling apparatus 130. No additional power leads are thus required for thermostat 10.

THE ALTERNATIVE EMBODIMENT OF FIG. 3

Figure 3:
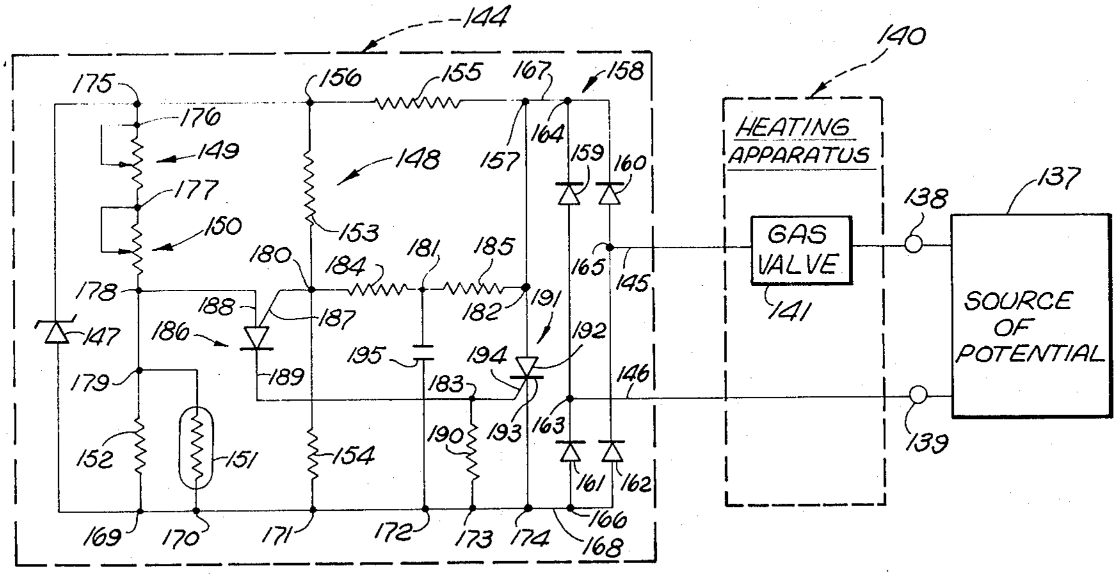
FIG. 3 is a schematic diagram of still another embodiment of the present invention.

In FIG. 3, a source of potential 137 is shown provided with output terminals 138 and 139 connected to heating apparatus 140 including a gas valve 141. Apparatus 140 has output terminals 142 and 143 which are connected to a thermostat 144 over leads 145 and 146, respectively. Thermostat 144 includes a zener diode 147 which serves as a voltage regulator the same as zener diode 59. Thermostat 144 includes a thermistor bridge 148 including potentiometers 149 and 150, a thermistor 151, a resistor 152, a resistor 153 and a resistor 154. A current limiting resistor 155 is connected between two junctions 156 and 157.

Thermostat 144 includes a diode bridge 158 including diodes 159, 160, 161 and 162. Diode bridge 158 has corners at junctions 163, 164, 165 and 166. A lead 167 connects junctions 157 and 164. A lead 168 connects junctions 169, 170, 171, 172, 173 and 174 with junction 166.

Thermostat 144 also has junctions at 175, 176, 177, 178, 179, 180, 181, 182 and 183.

Zener diode 147 is connected between junctions 169 and 175. Junctions 175 and 176 are connected together. Potentiometer 149 is connected between junctions 176 and 177. Potentiometer 150 is connected between junctions 177 and 178. Junctions 178 and 179 are connected together. Thermistor 151 is connected between junctions 170 and 179. Resistor 152 is connected in parallel with thermistor 151. Resistor 153 is connected between junctions 156 and 180. Junctions 156 and 175 are connected together. A resistor 184 is connected between junctions 181 and 180. A resistor 185 is connected between junctions 181 and 182. Junctions 157 and 182 are connected together. A unijunction transistor 186 is provided having first and second bases 187 and 188 respectively connected from junctions 180 and 178. Transistor 186 has an emitter 189 connected to junction 183. Resistor 154 is connected between junctions 180 and 171. A resistor 190 is connected between junctions 173 and 183. An SCR 191 is also provided having an anode 192, a cathode 193 and a gate 194 connected respectively from junctions 182, 174 and 183.

The embodiment of FIG. 3 may be easier to understand and from it, it may be easier to understand that thermostat 144 requires no more leads than is required to operate gas valve 41. Note will be taken that if a simple switch were in series with gas valve 141, two leads would still be required at 145 and 146 to be connected from opposite sides of such a simple switch to turn gas valve 141 on or off. On the other hand, only the two leads 145 and 146 are provided to thermostat 144, thermostat 144 deriving its power from source 137 through gas valve 141. This is true even though gas valve 141 may or may not be actuated.

Note will be taken that heating apparatus 129, shown in FIG. 2, and gas valve 141 may both be entirely conventional solenoid valves.

In FIG. 3, a capacitor 195 is connected between junctions 181 and 172. Capacitor 195 prevents fast cycling.

In the absence of capacitors 78 and 84 in FIG. 1, when the potential across the amplifier input is substantially zero, instability can occur during the times when the line voltage goes through zero potential. This instability is eliminated by the aforementioned capacitors 78 and 84. This is done by providing a memory at the input of the amplifier that definitely determines the state of the amplifier at all times. The function of the capacitor 195 in FIG. 3 is substantially the same as that of capacitors 78 and 84 in FIG. 1.

The phrase "comfort control system," as used herein, may be employed to describe the thermostats 10 and 144 herein or portions thereof in combination with heat exchange apparatus 11 or heat exchange apparatus 140 shown in FIGS. 2 and 3, respectively. Alternatively, the phrase "comfort control system" may be employed to describe simply the thermostat 10 or the thermostat 144.

The thermostat 10, as shown in FIG. 2, may be described as a "solid state thermostat" because transistors and semi-conductor diodes may be employed. The same is true of the SCR 90 and the zener diode 59.

Either the heating apparatus 129 shown in FIG. 2 or the heating apparatus 140 shown in FIG. 3 may include a gas valve which can be described as "one electrically energizable component."

Either the resistor bridge 16 or the resistor bridge 148 may be described as a "solid state sensing circuit." Each resistor bridge 16 and 148 has four legs. In bridge 16, the leg including potentiometers 17 and 18 may be described as the first leg. The leg in which resistor 20 is located may be described as the second leg. Hence, resistor 21 is in the third leg, and thermistor 19 is in the fourth leg.

In FIG. 3, potentiometers 149 and 150 are in the first leg of bridge 148. Resistors 153 and 154 are in the second and third legs of the bridge, respectively. Thermistor 151 is again in the fourth leg of the bridge.

In FIG. 2, when SCR 90 has been fired, the current which flows in lead 57 may be considered the "main current." This is true because this is the current which energizes, for example, the gas valve in heating apparatus 129 and in heating apparatus 140.

When SCR 90 is cut off, the main current is effectively zero. When SCR 90 is turned on, effectively a short circuit exists through the anode-cathode path of SCR 90 from junction 25 to junction 41. All this also applies to the embodiment of the invention illustrated in FIG. 3. However, if desired, when SCR 191 has fired, the main current in this case may be defined as that current which flows in lead 167.

The phrase "auxiliary current," as used herein, means that current which flows through leads 57 and 167 when SCR's 90 and 191 have not fired, respectively. The auxiliary current is of a magnitude smaller than the main current because the gas valve takes considerably more current than the thermostats 10 and 144 when the SCR's are at cut off. The gas valve in either case cannot draw enough current so that the solenoid thereof is energized when SCR 90 or SCR 191 is cut off.

The junctions 31, 22, 29 and 34 of bridge 16 in FIG. 2 may be described as first, second, third and fourth junctions, respectively. Similarly, the junctions 178, 175, 180 and 171 of bridge 148 in FIG. 3 may be described as first, second, third and fourth junctions, respectively.

The phrase "gating circuit" may be employed to describe that portion of thermostat 10 including SCR 90 and the structures to the right thereof, as viewed in FIG. 2. Similarly, the phrase "gating circuit" may be employed to describe the SCR 191 and the structures to the right thereof in thermostat 144 shown in FIG. 3, The phrase "control means" may be employed to describe the circuit of thermostat 10 without the bridge 16 and without the gating circuit. Similarly, the phrase "control means" may be employed to describe the thermostat 144 without the bridge 148 and without the gating circuit.

In FIG. 2, diodes 53, 54, 56 and 55 may be described as being in diode bridge 52 in first, second, third and fourth legs, respectively, thereof. Diodes 53, 54, 56 and 55 may be described as first, second, third and fourth diodes, respectively. Junctions 50, 26, 51 and 42 may be described as fifth, sixth, seventh and eighth junctions, respectively.

In FIG. 3, diodes 159, 160, 162 and 161 may be described as being in first, second, third and fourth legs of bridge 158. Diodes 159, 160, 162 and 161 may be described as first, second, third and fourth diodes, respectively.

In FIG. 3, junctions 163, 164, 165 and 166 may be described as fifth, sixth, seventh and eighth junctions, respectively.

In FIG. 2, the lead which connects junction 26 with resistor 58 may be described as a "first auxiliary lead." The same is true of the lead connecting junction 164 and resistor 155 in FIG. 3.

In FIG. 2, the lead which connects junctions 42 and 40 may be described as a "second auxiliary lead." The same is true in FIG. 3 of the lead which connects junctions 166 and 173.

In FIGS. 2 and 3, the respective resistors 58 and 155 may be described as "current limiting resistors."

In FIG. 3, unijunction transistor 186 may be described as having a first base 187, a second base 188 and an emitter 189. Resistors 184, 185 and 190 may be described as first, second and third resistors, respectively.

Junction 181 may be described as a mutual junction of resistors 184 and 185.

In one of their alternatives, resistors 19' in FIG. 2 and 152 in FIG. 3 may be described as "auxiliary resistors."

In FIG. 2, switch 63 may be described as having first and second poles 64 and 65, respectively. Contacts 66, 67 and 68 may be described as first, second and third contacts, respectively. Contacts 69, 70 and 71 may be fourth, fifth and sixth contacts, respectively. Switches 63 and 72 may be described as first and second switches, respectively. Contacts 74 and 75 may be described as seventh and eighth contacts, respectively. Apparatus 131 may be described as "fan means."

Resistors 83 and 77 may be described as first and second resistors, respectively. Capacitors 84 and 78 may be described as first and second capacitors, respectively.

The phrase "first feedback means" may include resistor 85. The phrase "first feedback means" may include the resistor 79. Alternatively, the first feedback means may include resistor 85 and resistor 21. In another alternative, the second feedback means may include resistor 79 and resistor 19'.

In FIG. 2, resistor 88 may be described as a third resistor. Resistor 89 may be described as a fourth resistor. Third and fourth resistors 88 and 89 may be described as having a mutual junction 49. Resistors 85, 21, 79 and 19' may also be described as fifth, sixth, seventh and eighth resistors, respectively. A junction 32' may be described as the mutual junction of the seventh and eighth resistors 79 and 19', respectively.

In both FIGS. 2 and 3, bridges 16 and 48 may be respectively referred to as a sensor. All of the circuit of the thermostats 10 and 144, without the bridges 16 and 148 thereof, respectively, may be considered "an electrical circuit."

What is claimed is:

1. A comfort control system comprising: heat exchange apparatus mounted in a position to and actuable electrically to change the heat content of air in a predetermined space; and a solid state thermostat in said space, said apparatus including at least one electrically energizable component with two leads; and a source of potential having two output leads, one of said source leads being connected to one of said component leads, the other of said component leads being connected to said thermostat, the other of said source leads also being connected to said thermostat, said thermostat being insulated from said source except for the said connections of said other leads thereto, said thermostat including a solid state sensing circuit having a resistor bridge having first, second, third and fourth legs, a set point potentiometer in said first leg, a thermistor in said fourth leg, said thermostat controlling the flow of main current in said other leads in accordance with the difference between the set point of said potentiometer and the temperature sensed by said thermistor, said thermostat drawing an auxiliary current from said other leads to operate it, said auxiliary current being of a magnitude smaller than that of said main current so as to prevent actuation of said component when the thermostat set point is equal to the temperature sensed by said thermistor; said first resistor bridge leg being connected between first and second junctions, said second leg being connected between said second junction and a third junction, said third leg being connected between said third junction and a fourth junction, said fourth leg being connected between said fourth and first junctions, said second and third legs each including a bridge resistor, said thermostat also including a gating circuit connected between said other leads and actuable to pass a predetermined main current of a magnitude to actuate said component, control means connected from said first and third junctions to actuate said gating circuit in a manner to cause said predetermined main current to flow when the set point of the thermostat is different in one polarity sense from the temperature sensed by said thermistor; said gating circuit including a diode bridge having first, second, third and fourth diodes in first, second, third and fourth legs thereof, respectively, said diode bridge including fifth, sixth, seventh and eighth junctions, said first, second, third and fourth legs being respectively connected between said fifth and sixth, sixth and seventh, seventh and eighth and eighth and fifth junctions, said first and second diodes being poled in a direction toward said sixth junction, said third and fourth diodes being poled in a direction away from said eighth junction, a silicon-controlled rectifier having an anode, a cathode and a gate, said anode and cathode being connected to said sixth and eighth junctions, respectively, said gate being connected from said control means, a first auxiliary lead connected between said sixth junction and said control means and said second junction, a second auxiliary lead connected between said eighth junction and said control means and said fourth junction.

2. The invention as defined in claim 1, including a current limiting resistor connected in series with at least one of said auxiliary leads.

3. A comfort control system comprising: heat exchange apparatus mounted in a position to and actuable electrically to change the heat content of air in a predetermined space; and a solid state thermostat in said space, said apparatus including at least one electrically energizable component with two leads; and a source of potential having two output leads, one of said source leads being connected to one of said component leads, the other of said component leads being connected to said thermostat, the other of said source leads also being connected to said thermostat, said thermostat being insulated from said source except for the said connections of said other leads thereto, said thermostat including a solid state sensing circuit having a resistor bridge having first, second, third and fourth legs, a set point potentiometer in said first leg, a thermistor in said fourth leg, said thermostat controlling the flow of main current in said other leads in accordance with the difference between the set point of said potentiometer and the temperature sensed by said thermistor, said thermostat drawing an auxiliary current from said other leads to operate it, said auxiliary current being of a magnitude smaller than that of said main current so as to prevent actuation of said component when the thermostat set point is equal to the temperature sensed by said thermistor; said first resistor bridge leg being connected between first and second junctions, said second leg being connected between said second junction and a third junction, said third leg being connected between said third junction and a fourth junction, said fourth leg being connected between said fourth and first junctions, said second and third legs each including a bridge resistor, said thermostat also including a gating circuit connected between said other leads and actuable to pass a predetermined main current of a magnitude to actuate said component, and control means connected from said first and third junctions to actuate said gating circuit in a manner to cause said predetermined main current to flow when the set point of the thermostat is different in one polarity sense from the temperature sensed by said thermistor; said gating circuit including a diode bridge having first, second, third and fourth diodes in first, second, third and fourth legs thereof, respectively, said diode bridge including fifth, sixth, seventh and eighth junctions, said first, second, third and fourth legs being respectively connected between said fifth and sixth, sixth and seventh, seventh and eighth and eighth and fifth junctions, said first and second diodes being poled in a direction toward said sixth junction, said third and fourth diodes being poled in a direction away from said eighth junction, a silicon-controlled rectifier having an anode, a cathode and a gate, said anode and cathode being connected to said sixth and eighth junctions, respectively, said gate being connected from said control means, a first auxiliary lead connected between said sixth junction and said control means and said second junction, a second auxiliary lead connected between said eighth junction and said control means and said fourth junction; said control means including a unijunction transistor having first and second bases and an emitter, first, second and third resistors, and a capacitor, said first and second bases being connected from said first and third junctions, respectively, said emitter being connected to said gate, said first and second resistors being respectively connected together from said third junction and said anode to a mutual junction, said capacitor being connected from said mutual junction to said fourth junction, said third resistor being connected from said gate to said fourth junction, and an auxiliary resistor connected in parallel with said thermistor.

4. The invention as defined in claim 3, including a current limiting resistor connected in series with at least one of said auxiliary leads.

5. The invention as defined in claim 4, including a zener diode connected between said second and fourth junctions and poled to be back biased by a potential at said second junction positive with respect to that at said fourth junction.

6. A comfort control system comprising: heat exchange apparatus mounted in a position to and actuable electrically to change the heat content of air in a predetermined space; and a solid state thermostat in said space, said apparatus including at least one electrically energizable component with two leads; and a source of potential having two output leads, one of said source leads being connected to one of said component leads, the other of said component leads being connected to said thermostat, the other of said source leads also being connected to said thermostat, said thermostat being insulated from said source except for the said connections of said other leads thereto, said thermostat including a solid state sensing circuit having a resistor bridge having first, second, third and fourth legs, a set point potentiometer in said first leg, a thermistor in said fourth leg, said thermostat controlling the flow of main current in said other leads in accordance with the difference between the set point of said potentiometer and the temperature sensed by said thermistor, said thermostat drawing an auxiliary current from said other leads to operate it, said auxiliary current being of magnitude smaller than that of said main current so as to prevent actuation of said component when the thermostat set point is equal to the temperature sensed by said thermistor; said first resistor bridge leg being connected between first and second junctions, said second leg being connected between said second junction and a third junction, said third leg being connected between said third junction and a fourth junction, said fourth leg being connected between said fourth and first junction, said second and third legs each including a bridge resistor, said thermostat also including a gating circuit connected between said other leads and actuable to pass a predetermined main current of a magnitude to actuate said component, and control means connected from said first and third junctions to actuate said gating circuit in a manner to cause said predetermined main current to flow when the set point of the thermostat is different in one polarity sense from the temperature sensed by said thermistor; said gating circuit including a diode bridge having first, second, third and fourth diodes in first, second, third and fourth legs thereof, respectively, said diode bridge including fifth, sixth, seventh and eighth junctions, said first, second, third and fourth legs being respectively connected between said fifth and sixth, sixth and seventh, seventh and eighth and eighth and fifth junctions, said first and second diodes being poled in a direction toward said sixth junction, said third and fourth diodes being poled in a direction away from said eighth junction, a silicon-controlled rectifier having an anode, a cathode and a gate, said anode and cathode being connected to said sixth and eighth junctions, respectively, said gate being connected from said control means, a first auxiliary lead connected between said sixth junction and said control means and said second junction, a second auxiliary lead connected between said eighth junction and said control means and said fourth junction; said thermostat including a double-pole, triple-throw first switch having a first pole with first, second and third contacts, and a second pole with fourth, fifth and sixth contacts, said first and second poles having first, second and third positions in which they simultaneously engage said first and fourth, second and fifth, and third and sixth contacts, respectively, heating apparatus connected from said one source lead, a heat anticipator connected from said fourth contact to said heating apparatus, cooling apparatus connected from said sixth contact to said one source lead, a single-pole, double-throw second switch having a pole and seventh and eighth contacts, said sixth and seventh contacts being connected together, fan means connected from said second switch pole to said one source lead, a cool anticipator connected between said sixth contact and said other source lead, a plenum thermostat in series with said fan means, said first switch second pole being connected to said fifth junction, said eighth contact being connected to said other source lead, said control means including a differential amplifier having inverting and non-inverting inputs connected from said third and first junctions, respectively, said amplifier having inverted and non-inverted outputs connected to said third and first junctions, respectively, said first pole being connected to said silicon-controlled rectifier gate.

7. The invention as defined in claim 6, including a first resistor and a first capacitor connected in series in that order from said inverted output to a point of reference potential, a second resistor and a second capacitor connected in series in that order from said non-inverted output to said point, first feedback means connecting the mutual junction of said first resistor and said first capacitor to said inverting input, second feedback means connecting the mutual junction of said second resistor and said second capacitor to said non-inverting input.

8. The invention as defined in claim 7, wherein third and fourth resistors are connected in series in that order from said first pole to said point, said rectifier gate being connected from the mutual junction of said third and fourth resistors, said first means including fifth and sixth resistors connected in series in that order from the mutual junctions of said first resistor and said first capacitor to said point, said inverting input being connected to the mutual junction of said fifth and sixth resistors, said second means including seventh and eighth resistors connected in series in that order from the mutual junction of said second resistor and said second capacitor to said point, said non-inverting input being connected to the mutual junction of said seventh and eighth resistors, a current limiting resistor being connected in series with a lead connected from one of said sixth and eighth junctions, and a zener diode connected between said second and fourth junctions and poled to be back biased when said second junction is maintained positive with respect to said fourth junction.

9. A comfort system comprising: an electrically operable temperature sensor positioned in a predetermined space for producing an output signal in accordance with the difference between a set temperature and ambient; heat exchange apparatus constructed and positioned in a manner such that it is actuable, respectively, to change the heat control of air in said space; and an electrical circuit connected from and responsive to the said sensor output signal to actuate said apparatus in a manner to reduce the difference between set point and ambient substantially to zero, said sensor and said circuit having at least two leads connected therefrom for connection to an A.C. voltage supply, said apparatus being connected in series with one of said leads, said circuit including a silicon-controlled rectifier (SCR) having an anode connected to one of said leads, a cathode connected to the other of said leads, and a gate, said circuit being adapted to impress a voltage on said gate to cause said SCR to short circuit said sensor, said circuit and said two leads, said short circuit being undisturbed during each of a plurality of successive half cycles of A.C. voltage appearing between said leads after said SCR has fired due to the loss of control to which the gate voltage is subjected after firing has occurred, said sensor and said circuit drawing insufficient current through one complete half cycle of said A.C. voltage to actuate said apparatus when said SCR does not fire at any point during the same said one complete half cycle.

* * * * *